(12) United States Patent
Takechi et al.

(10) Patent No.: US 9,209,489 B2
(45) Date of Patent: Dec. 8, 2015

(54) BATTERY AND MIXED MOLTEN LIQUID

(71) Applicant: KABUSHIKI KAISHA TOYOTA CHUO KENKYUSHO, Nagakute-shi, Aichi-ken (JP)

(72) Inventors: Kensuke Takechi, Nagoya (JP); Yoko Hase, Nagoya (JP); Emi Ito, Ama (JP)

(73) Assignee: KABUSHIKI KAISHA TOYOTA CHUO KENKYUSHO, Nagakute-shi (JP)

(*) Notice: Subject to any disclaimer, the term of this patent is extended or adjusted under 35 U.S.C. 154(b) by 44 days.

(21) Appl. No.: 14/079,552

(22) Filed: Nov. 13, 2013

(65) Prior Publication Data

US 2014/0147720 A1    May 29, 2014

(30) Foreign Application Priority Data

Nov. 26, 2012    (JP) ................................. 2012-257466
Sep. 3, 2013    (JP) ................................. 2013-182173

(51) Int. Cl.
  *H01M 4/36*    (2006.01)
  *H01M 10/0566*    (2010.01)
  *H01M 10/39*    (2006.01)
  *H01M 10/0567*    (2010.01)

(52) U.S. Cl.
  CPC ........ *H01M 10/0566* (2013.01); *H01M 10/399* (2013.01); *H01M 10/0567* (2013.01); *H01M 2300/0045* (2013.01); *H01M 2300/0048* (2013.01); *Y02E 60/122* (2013.01)

(58) Field of Classification Search
  CPC .............. H01M 10/0566; H01M 10/0567; H01M 10/399; H01M 2300/0045; H01M 2300/0048; Y02E 60/122
  USPC ......................................... 429/103, 104, 207
  See application file for complete search history.

(56) References Cited

U.S. PATENT DOCUMENTS

| | | | | |
|---|---|---|---|---|
| 5,436,549 | A | * | 7/1995 | Lundquist et al. ............ 320/128 |
| 5,763,117 | A | * | 6/1998 | Wright et al. ................. 429/104 |
| 2011/0287305 | A1 | * | 11/2011 | Scordilis-Kelley et al. .. 429/163 |

FOREIGN PATENT DOCUMENTS

| | | |
|---|---|---|
| JP | A-2000-268861 | 9/2000 |
| JP | A-2005-100966 | 4/2005 |
| JP | A-2005-228712 | 8/2005 |
| JP | A-2009-295881 | 12/2009 |

* cited by examiner

*Primary Examiner* — Patrick Ryan
*Assistant Examiner* — Ben Lewis
(74) *Attorney, Agent, or Firm* — Oliff PLC

(57) ABSTRACT

An electrochemical cell 10 includes a case 12 serving as an insulating tube, an inner container 13 disposed on the inside wall of the case 12, a separator 14 separating the inside of the case 12 into a positive electrode chamber 20 and a negative electrode chamber 30, a mixed molten liquid 22 which is stored in the positive electrode chamber 20 and which contains a positive electrode active material and a supporting electrolyte, and a negative electrode active material 32 stored in the negative electrode chamber 30. The mixed molten liquid is a liquid obtained by mixing a radical compound having a nitroxyl radical site and serving as an active material and a metal salt having a fluoroalkylsulfonyl site and serving as a supporting electrolyte.

14 Claims, 6 Drawing Sheets

BATTERY AND MIXED MOLTEN LIQUID

BACKGROUND OF THE INVENTION

1. Field of the Invention

The present invention relates to a battery and a mixed molten liquid.

2. Description of the Related Art

Hitherto, a battery has been proposed, wherein a nitroxyl compound serving as a positive electrode active material is dissolved in an electrolytic solution in which $LiPF_6$ serving as a supporting electrolyte is contained in ethylene carbonate or the like serving as an organic solvent (refer to PTL 1, for example). It is disclosed that, in this battery, the nitroxyl compound dissolved in the electrolytic solution exerts a catalytic effect on the lithium metal surface of a negative electrode and, thereby, dendrite growth on the negative electrode surface can be suppressed to improve the cycle characteristics of charge and discharge. Meanwhile, a battery has been proposed, wherein a nitroxyl compound serving as an additive is contained in an electrolytic solution in which $LiPF_6$ serving as a supporting electrolyte is contained in ethylene carbonate or the like serving as an organic solvent (refer to PTL 2, for example). In this battery, degradation in a nonaqueous electrolytic solution caused by decomposition of a solvent is suppressed by the nitroxyl compound, so that the cycle characteristics and the storage characteristics of a secondary battery are improved.

CITATION LIST

Patent Literature

[PTL 1] Japanese Unexamined Patent Application Publication No. 2005-228712
[PTL 2] Japanese Unexamined Patent Application Publication No. 2000-268861

SUMMARY OF THE INVENTION

However, in the above-described battery of PTL 1, the supporting electrolyte is dissolved into the solvent and, in addition, an active material is dissolved into the solvent, so that the electrolytic solution requires an active material, a supporting electrolyte, and a solvent and the energy density is reduced inevitably. Meanwhile, in the battery of PTL 2, an active material besides the electrolytic solution is present on an electrode.

The present invention has been made in consideration of such problems, and the main object is to provide a new liquid active material having a higher amount of energy.

In order to achieve the above-described objects, the present inventors performed intensive research and, as a result found that a nitroxyl radical compound and a bis(trifluoromethanesulfonyl)imide compound were liquefied by physical mixing and a solvent was not required. Consequently, the present invention has been completed.

That is, a battery of the present invention includes a mixed molten liquid obtained by mixing a radical compound having a nitroxyl radical site and a metal salt having a fluoroalkylsulfonyl site.

In the present invention, a mixed molten liquid is a liquid in which a radical compound having a nitroxyl radical site and a metal salt having a fluoroalkylsulfonyl site are mixed.

The battery and the mixed molten liquid according to the present invention can provide a new liquid active material having a higher amount of energy. The reason for this is not certain, but is estimated as described below. For example, the reason is estimated that when a radical compound, which has a nitroxyl radical site and which is solid at ambient temperature, and a metal salt, which has a fluoroalkylsulfonyl site and which is solid at ambient temperature, are directly physically mixed, some type of supercooling phenomenon occurs, where crystallization does not occur even at a temperature lower than the melting point. In this regard, the mixed molten liquid does not require a solvent and, therefore, the concentration of the active material is very high and a liquid active material having a very large energy density can be realized.

DESCRIPTION OF THE PREFERRED EMBODIMENTS

A battery according to the present invention includes a mixed molten liquid obtained by mixing a radical compound having a nitroxyl radical site (hereafter may be simply referred to as a radical compound) and a metal salt having a fluoroalkylsulfonyl site (hereafter may be simply referred to as a metal salt). This mixed molten liquid is produced by physically mixing a radical compound, which is solid at ambient temperature (for example, 20° C.), and a metal salt, which is solid at ambient temperature. In the battery according to the present invention, the radical compound may be an active material and the metal salt may be a supporting electrolyte. Also, the mixed molten liquid may contain no solvent. Consequently, a liquid active material having a higher energy density can be obtained.

Figure 1:
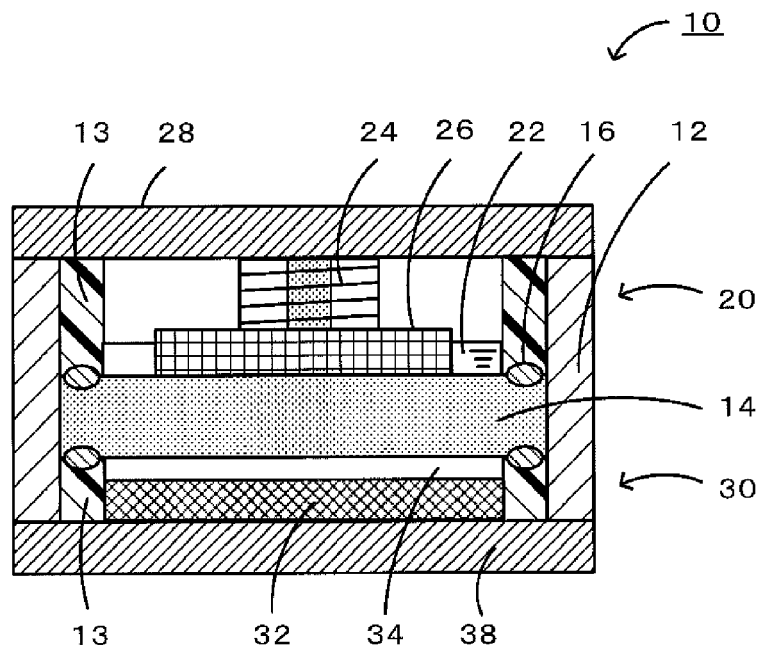
FIG. 1 is a schematic sectional view of an electrochemical cell 10.

The battery according to the present invention may include a case, a separator separating the inside of the case into a positive electrode chamber and a negative electrode chamber, the mixed molten liquid, according to the present invention, stored in the positive electrode chamber while being in contact with a collector, and a negative electrode active material stored in the negative electrode chamber. FIG. 1 is a schematic sectional view of an electrochemical cell 10 as an example of the battery according to the present invention. This electrochemical cell 10 includes a case 12 serving as an insulating tube, an inner container 13 disposed on the inside wall of this case 12, a separator 14 separating the inside of the case 12 into a positive electrode chamber 20 and a negative electrode chamber 30, a mixed molten liquid 22 which is stored in the positive electrode chamber 20 and which contains a positive electrode active material and a supporting electrolyte, and a negative electrode active material 32 stored in the negative electrode chamber 30. In the positive electrode chamber 20, a positive electrode collector 26 pressed against a separator 14 side by a collector spring 24 is disposed in contact with the mixed molten liquid 22, and the positive electrode collector 26 is electrically connected to a positive electrode terminal 28 through this collector spring 24. In this positive electrode chamber 20, an O ring 16 is disposed between the inner container 13 and the separator 14, so as to prevent leakage of the mixed molten liquid 22. Meanwhile, in the negative electrode chamber 30, the negative electrode active material 32 is disposed on a negative electrode terminal 38, and a negative electrode electrolytic solution 34 is filled in between the negative electrode active material 32 and the separator 14. In this negative electrode chamber 30, an O ring 16 is disposed between the inner container 13 and the separator 14, so as to prevent leakage of the negative electrode electrolytic solution 34. The separator 14 is to separate the solutions stored in the positive electrode chamber 20 and the negative electrode chamber 30. The shape of the battery according to the present invention is not specifically limited, and examples thereof include a coin type, a button type, a sheet type, a stacked layer type, a circular cylinder type, a flat type, and a square type. Also, the battery may be applied to a large one and the like used for an electric car and the like.

In the battery according to the present invention, the radical compound may have a structure represented by the following formula (1). In the formula (1), $R^1$ to $R^4$ represent alkyl groups which may be the same or different. In this regard, this radical compound is more preferably a compound represented by the following formula (2). In the formula (2), A represents —OC(=O)$R^5$, —NHC(=O)$R^5$, or —O$R^5$, $R^1$ to $R^4$ represent alkyl groups which may be the same or different, and $R^5$ represents a phenyl group or an alkyl group. Here, the alkyl group has preferably the carbon number of 1 or more and 12 or less, and more preferably the carbon number of 1 or more and 3 or less, for example. Specific examples include 2,2,6,6-tetramethylpiperidine-1-oxyl radical (TEMPO), N-(3,3,5,5-tetramethyl-4-oxypiperidyl)pyrene-1-carboxyamide (Pyrene-TEMPO), 4-methoxy-2,2,6,6-tetramethylpiperidine-1-oxyl radical (MeO-TEMPO), 4-hydroxy-2,2,6,6-tetramethylpiperidine-1-oxybenzoate (BzO-TEMPO), and 4-acetamide-2,2,6,6-tetramethyl-1-piperidinyloxy (Ac-TEMPO). Among them, TEMPO (formula (3)), MeO-TEMPO (formula (4)), and the like are preferable. These radical compounds may be used alone or a plurality of types may be used in combination.

[Chem. 1]

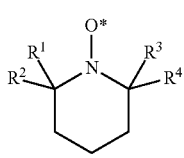

Formula (1)

[Chem. 2]

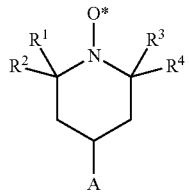

Formula (2)

[Chem. 3]

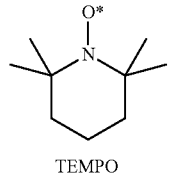

TEMPO

Formula (3)

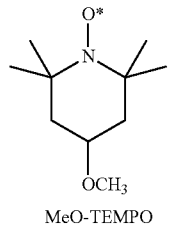

MeO-TEMPO

Formula (4)

In the battery according to the present invention, the metal salt has a fluoroalkylsulfonyl site. Here, the fluoroalkylsulfonyl site refers to a structure in which an alkyl group having at least one fluoro group and a sulfonyl group are bonded. Examples thereof include $CF_3SO_2$— and $CF_3CF_2SO_2$—. In addition, the metal salt has preferably an imide structure. For example, the metal salt contains bis(trifluoromethanesulfonyl)imide (($CF_3SO_2)_2N^-$), bis(pentafluoroethanesulfonyl)imide ($N(C_2F_5SO_2)_2^-$), trifluoromethanesulfonic acid ($CF_3SO_3^-$), nonafluorobutanesulfonic acid ($C_4F_9SO_3^-$), or the like and preferably contains at least one of bis(trifluoromethanesulfonyl)imide (LiTFSI) and bis(pentafluoroethanesulfonyl)imide (LiBETI).

In the battery according to the present invention, preferably, the metal salt contains a group 1 element and a group 2 element as cations, and it is preferable that lithium and magnesium be contained among them. That is, the metal salt according to the present invention is preferably a lithium salt and a magnesium salt, and more preferably a lithium salt. For example, lithium bis(trifluoromethanesulfonyl)imide and lithium bis(pentafluoroethanesulfonyl)imide are preferable. Such metal salts become mixed molten liquids easily when being mixed with radical compounds.

In the battery according to the present invention, the mixed molten liquid has a viscosity of preferably 10,000 mPa·s or less, more preferably 7,000 mPa·s or less, further preferably 1,000 mPa·s or less, and still more preferably 700 mPa·s or less. The reason is considered to be that in the case where the viscosity is 10,000 mPa·s or less, a reduction in the capacity can be suppressed because, for example, the wettability between the mixed molten liquid and the positive electrode collector is improved. In addition, in the case of use for a flow battery or the like in which the mixed molten liquid serving as an active material solution is circulated, it is considered that use of an active material solution having a low viscosity can reduce the resistance during circulation of the active material solution and is suitable for increasing the capacity. The lower limit of the viscosity is not specifically limited and, for example, may be specified to be 4 mPa·s or more, may be specified to be 5 mPa·s or more, may be specified to be 10 mPa·s or more, or may be specified to be 16 mPa·s or more.

In the mixed molten liquid of the battery according to the present invention, the molar ratio B/A of the number of moles B of the metal salt to the number of moles A of the radical compound is preferably within the range of 1/50 or more and 2/1 or less. In this range, the mixed molten liquid is obtained when the radical compound and the metal salt are mixed. This molar ratio B/A is more preferably within the range of 1/20 or more and 1/1 or less, and further preferably within the range of 1/5 or more and 1/1 or less because the mixed molten liquid is obtained more easily when the radical compound and the metal salt are mixed. Here, it is considered that as the molar ratio B/A becomes close to 1/1, the utilization factors of the radical compound and the metal salt can be increased and the theoretical capacity can be increased. Meanwhile, as the molar ratio B/A becomes larger than or smaller than 1/1, in particular the molar ratio B/A becomes smaller than 1/1, the viscosity of the mixed molten liquid can be decreased. Consequently, from the viewpoint of increases in the utilization factors of the radical compound and the metal salt, it is preferable that the molar ratio B/A is specified to be a value closer to 1/1. For example, the molar ratio B/A is preferably specified to be 1/3 or more or 3/1 or less, more preferably specified to be 1/2 or more or 2/1 or less, and further preferably specified to be 2/3 or more or 3/2 or less. On the other hand, from the viewpoint of a decrease in the viscosity, it is preferable that B/A is specified to become larger than or smaller than 1/1. For example, the molar ratio B/A is preferably specified to be 2/3 or less or 3/2 or more, more preferably specified to be 1/2 or less or 2/1 or more, and further preferably specified to be 1/3 or less or 3/1 or more.

In the battery according to the present invention, the mixed molten liquid contains the radical compound preferably at a concentration of 0.5 mol/L or more, more preferably at a concentration of 0.8 mol/L or more, further preferably at a concentration of 1.5 mol/L or more, and still more preferably at a concentration of 1.8 mol/L or more. The case of 0.5 mol/L or more is preferable because, for example, a larger amount of active material is contained in the mixed molten liquid. Among them, in the case where the mixed molten liquid contains a larger amount of radical compound as compared with a metal salt, for example, in the case where the above-described molar ratio B/A is 1/3 or less, the mixed molten liquid contains the radical compound preferably at a concentration of more than 3.0 mol/L, and more preferably at a concentration of more than 4.0 mol/L. Meanwhile, in the case where the mixed molten liquid contains a smaller or equal amount of radical compound as compared with a metal salt, for example, in the case where the above-described molar ratio B/A is 1/1 or more, the mixed molten liquid contains the radical compound preferably at a concentration of 3.0 mol/L or less, more preferably at a concentration of 2.9 mol/L or less, further preferably at a concentration of 2.8 mol/L or less, and still more preferably at a concentration of 2.7 mol/L or less. Also, the mixed molten liquid contains the metal salt preferably at a concentration of 0.5 mol/L or more, more preferably at a concentration of 0.8 mol/L or more, further preferably at a concentration of 1.5 mol/L or more, and still more preferably at a concentration of 1.8 mol/L or more. The case of 0.5 mol/L or more is preferable because, for example, a larger amount of supporting electrolyte is contained in the mixed molten liquid. The upper limit of the concentration of the metal salt is not specifically limited. For example, the mixed molten liquid may contain the metal salt at a concentration of 3.0 mol/L or less, more preferably at a concentration of 2.9 mol/L or less, further preferably at a concentration of 2.8 mol/L or less, and still more preferably at a concentration of 2.7 mol/L or less.

In the battery according to the present invention, the mixed molten liquid may contain 10 percent by mass of water as an additive to improve the charge-discharge characteristics. This water serving as an additive is contained by 10 percent by mass or less relative to the mass of the mixed molten liquid. According to this, the oxidation-reduction potential is shifted to the nobler side and, therefore, the battery can have higher energy. This water serving as an additive is more preferably contained at within the range of 0.1 percent by mass or more and 8 percent by mass or less, and is further preferably contained at within the range of 0.5 percent by mass or more and 5 percent by mass or less. At this time, the radical compound and the metal salt are mixed to produce the mixed molten liquid and, thereafter, the water serving as an additive may be added to the resulting mixed molten liquid. This water is not to dissolve the metal salt, but to more improve the charge-discharge characteristics.

In the battery according to the present invention, the mixed molten liquid may be produced by adding an additive to decrease the viscosity to a mixture liquefied by direct, physical mixing of a radical compound, which is solid at ambient temperature, and a metal salt, which is solid at ambient temperature. Addition of an additive to decrease the viscosity to such a mixed molten liquid can decrease the viscosity to a level lower than the viscosity of a mixed molten liquid not including the additive. Here, the additive is not specifically limited insofar as the viscosity is decreased, and examples include water and various organic solvents. Among them, water and acetonitrile are preferable, and water is more preferable because use of water as an additive is more suitable for increasing the capacity and can increase the discharge voltage. The amount of additive is not specifically limited. For example, the additive is preferably 5 percent by volume or more relative to the whole mixed molten liquid, more preferably 7 percent by volume or more, further preferably 10 percent by volume or more, and still more preferably 13 percent by volume or more. Meanwhile, 80 percent by volume or less is preferable, and 70 percent by volume or less is more preferable. In this regard, this additive is different from a solvent to dissolve the radical compound, which is solid at ambient temperature, and the metal salt, which is solid at ambient temperature, and is to decrease the viscosity of a mixture liquefied by mixing of the radical compound and the metal salt. For example, this additive may play a role of an additive to improve the above-described charge-discharge characteristics. In this regard, in the case where, for example, the above-described molar ratio B/A is close to 1/1, the additive has a major role in decreasing the viscosity. Meanwhile, in the case where the above-described molar ratio B/A is more than or less than 1/1, for example, in the case where B/A is 1/3 or less, the additive has a major role in improving the charge-discharge characteristics because the viscosity of the mixed molten liquid is relatively low even when the additive is not added.

The positive electrode of the battery according to the present invention may include, for example, the above-described mixed molten liquid and a collector in contact with this mixed molten liquid. As for the collector, besides carbon paper, aluminum, titanium, stainless steel, nickel, iron, baked carbon, electrically conductive polymer, electrically conductive glass, and the like, those in which the surfaces of aluminum, copper, and the like are treated with carbon, nickel, titanium, silver, and the like for the purpose of improving the adhesion, the electrical conductivity, and the oxidation resistance can be used. The surfaces of them may also be subjected to an oxidation treatment. Examples of shapes of the collector include the shape of foil, the shape of a film, the shape of a sheet, the shape of a net, a punched or expanded shape, a lath body, a porous body, a foamed body, and a fiber group-formed body. Collectors having thicknesses of, for example, 1 to 500 µm are used.

In the battery according to the present invention, the negative electrode may include, for example, a negative electrode active material and a collector. As for the negative electrode active material, metals, alloys, and various compounds can be used. For example, in the case of a lithium battery, inorganic compounds, e.g., lithium, lithium alloys, and tin compounds, carbonaceous materials which can occlude and release lithium ions, electrically conductive polymers, and the like can be used. Examples of carbonaceous materials include various types of coke, glassy carbon, graphite, nongraphitizable carbon, pyrolytic carbon, and carbon fiber. Among them, various types of graphite, e.g., artificial graphite and natural graphite, are preferable because the operation potential is close to that of metal lithium, charge and discharge can be performed at a high operation voltage, self discharge is suppressed when a lithium salt is used as an electrolyte salt, and an irreversible capacity is reduced during charge. As for the negative electrode collector, besides copper, nickel, stainless steel, titanium, aluminum, baked carbon, electrically conductive polymer, electrically conductive glass, Al—Cd alloys, and the like, those in which the surfaces of copper and the like are treated with carbon, nickel, titanium, silver, and the like for the purpose of improving the adhesion, the electrical conductivity, and the reduction resistance can also be used. The surfaces of them may also be subjected to an oxidation treatment. As for the shapes of the collector, the same shapes as the shape of the positive electrode can be employed.

The battery according to the present invention may include a separator between the negative electrode and the positive electrode. The separator is not specifically limited insofar as the composition is durable in the range of use of the battery. However, the separator has preferably a function of preventing the mixed molten liquid from reaching the negative electrode and is preferably a dense body. The separator can be, for example, a solid electrolyte having metal ion conductivity. Examples of solid electrolytes which conduct lithium include $Li_7La_3Zr_2O_{12}$, glass ceramic $Li_{1.5}Al_{0.5}Ge_{1.5}(PO_4)_3$, glass ceramic $Li_{1+x}Ti_2Si_xP_{3-x}O_{12} \cdot AlPO_4$, $Li_{3.25}Ge_{0.25}P_{0.25}S_4$, and garnet type oxide $Li_{6.75}La_3Zr_{1.75}Nb_{0.25}O_{12}$.

In the battery according to the present invention, an ion conductive medium may be filled in between the negative electrode and the separator. Consequently, the metal ion conductivity between the negative electrode and the separator can be more enhanced. In this regard, the ion conductive medium is not necessarily included insofar as the ionic conductivity between the negative electrode and the separator can be ensured. As for the ion conductive medium, a nonaqueous electrolytic solution, a nonaqueous gel electrolytic solution, or the like containing a supporting electrolyte can be used. Examples of solvents of the nonaqueous electrolytic solution include carbonates, esters, ethers, nitriles, furans, sulfolanes, and dioxolanes. They can be used alone or in combination. Specifically, examples of carbonates include cyclic carbonates, e.g., ethylene carbonate, propylene carbonate, vinylene carbonate, butylene carbonate, and chloroethylene carbonate, chain carbonates, e.g., dimethyl carbonate, ethyl methyl carbonate, diethyl carbonate, ethyl-n-butyl carbonate, methyl-t-butyl carbonate, di-i-propylcarbonate, and t-butyl-1-propyl carbonate. Examples of esters include cyclic esters, e.g., γ-butyrolactone and γ-valerolactone and chain esters, e.g., methyl formate, methyl acetate, ethyl acetate and methyl butyrate. Examples of ethers include dimetoxyethane, ethoxymethoxyethane, and diethoxy ethane, examples of nitriles include acetonitrile and benzonitrile, examples of furans include tetrahydrofuran and methyltetrahydrofuran, examples of sulfolanes include sulfolane and tetramethylsulfolane, and examples of dioxolanes include 1,3-dioxolane and methyldioxolane. Among them, combinations of the cyclic carbonates and chain carbonates are preferable. According to these combinations, not only the cycle characteristics, which represent battery characteristics in repetition of charge and discharge, are excellent, but also balance between the viscosity of the electrolytic solution, the electric capacity of the resulting battery, the battery output, and the like can be achieved.

Meanwhile, a solid ion conductive polymer or a gel electrolyte can also be used instead of the liquid ion conductive medium. Examples of gel electrolytes include those prepared by allowing polymers, e.g., polyvinylidene fluoride, polyethylene glycol, and polyacrylonitrile, amino acid derivatives, or saccharide, e.g., sorbitol derivatives, to include an electrolytic solution containing a lithium salt. In addition, ion conductive polymers and nonaqueous electrolytic solutions can also be used in combination.

The battery according to the present embodiment described above in detail includes the mixed molten liquid and, therefore, has a higher amount of energy. The reason this mixed molten liquid becomes liquid by mixing the radical compound, which is solid at ambient temperature, and the metal salt, which is solid at ambient temperature, is not certain, but is estimated as described below. For example, the reason is estimated that when a radical compound, which has a nitroxyl radical site, and a metal salt, which has a fluoroalkylsulfonyl site, are directly physically mixed, some type of supercooling phenomenon occurs, where crystallization does not occur even at a temperature lower than the melting point. This supercooling phenomenon is maintained in relatively wide temperature range (for example, −10° C. or higher) and a solvent is not included. Therefore, the concentration of the active material in the solution is very high and a liquid active material having a very large energy density can be realized.

Meanwhile, in the previously known flow battery by using a liquid active material, an aqueous solvent (any one of acidic, neutral, and alkaline) has been used and it is necessary that the voltage is specified to be within the range in which electrolysis of water does not occur. In addition, the solubility of the active material is low, so that, in some cases, the amount of electricity has become small and the amount of energy obtained from the battery has been small. On the other hand, as for the mixed molten liquid according to the present invention, the voltage can be the same as the voltage of the organic electrolytic solution and charge and discharge can be performed while a solvent is substantially not present, so that the amount of energy can be more increased.

The present invention is not limited to the foregoing embodiments. It will be obvious that various modifications may be made within the technical scope of the present invention.

For example, in the above-described embodiment, the battery including the mixed molten liquid is employed, although the mixed molten liquid may be employed. That is, a radical compound, which has a nitroxyl radical site, and a metal salt, which has a fluoroalkylsulfonyl site, may be mixed to prepare a mixed molten liquid. Consequently, the same effect as the effect of the above-described embodiment can be obtained.

Figure 2:
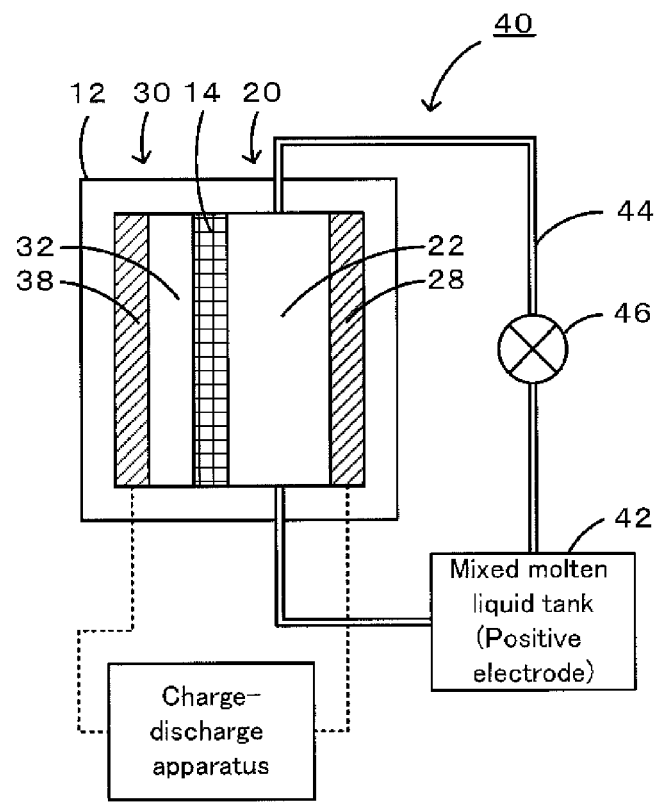
FIG. 2 is a schematic sectional view of a flow battery 40.

In the above-described embodiment, the battery storing the mixed molten liquid is employed, although a flow battery in which the mixed molten liquid is circulated may be employed. FIG. 2 is a schematic sectional view showing an example of a flow battery 40. In this regard, the same configurations as those of the electrochemical cell 10 are indicated by the same reference numerals and explanations thereof will not be provided. The flow battery 40 includes a mixed molten liquid tank 42 to store a mixed molten liquid 22 containing a positive electrode active material, a circulation path 44 connected to a positive electrode chamber 20 and the mixed molten liquid tank 42, and a circulation pump 46 which is disposed in the circulation path 44 and which circulates the mixed molten liquid. In this manner, it is also possible to perform charge and discharge while the mixed molten liquid is circulated. In this regard, a structure in which a negative electrode active material is also specified to be a liquid and the liquid active material is also circulated on the negative electrode side may be employed.

EXAMPLES

A case in which the battery according to the present invention was specifically produced will be described below as an example. Here, the electrochemical cell shown in FIG. 1 was produced and the battery characteristics were evaluated.

Example 1

Mixing of 2,2,6,6-tetramethylpiperidine-1-oxyl free radical (hereafter may be referred to as TEMPO) and lithium bis(trifluoromethanesulfonyl)imide (hereafter may be referred to as LiTESI) was performed at a molar ratio of 3:1 (molar ratio B/A=1/3). Both TEMPO and LiTESI were solid powders, and were dissolved by mixing to become a liquid. The resulting liquid is referred to as a mixed molten liquid. This mixed molten liquid was added by 100 μL to a positive electrode chamber of a two-chamber type electrochemical cell partitioned by a Li conductive ceramic (produced by OHARA INC.), and carbon paper serving as a collector was immersed. On the negative electrode side, 200 μL of mixed solvent of ethylene carbonate (EC)/diethyl carbonate (DEC) at a volume ratio of 3:7, in which 1 M of LiTFSI was dissolved, was added, and metal Li serving as a negative electrode active material was immersed. The theoretical capacity of the mixed molten liquid of TEMPO in Example 1 was 4.21 mAh on a 100 μL of mixed molten liquid basis. In this regard, TEMPO was contained at a concentration of 4.9 M in the mixed molten liquid in Example 1. Also, the viscosity of this mixed molten liquid was 1,521 mPa·s.

Example 2

A battery was produced in the same configuration as Example 1 except that 2,2,6,6-tetramethylpiperidine-1-oxyl free radical was changed to 4-methoxy-2,2,6,6-tetramethylpiperidine-1-oxyl free radical (hereafter may be referred to as MeO-TEMPO), and this was taken as Example 2. The theoretical capacity of the mixed molten liquid of MeO-TEMPO in Example 2 was 3.96 mAh on a 100 μL of mixed molten liquid basis. In this regard, MeO-TEMPO was contained at a concentration of 4.4 M in the mixed molten liquid in Example 2. Also, the viscosity of this mixed molten liquid was 1,369 mPa·s.

Example 3

A battery was produced in the same configuration as Example 2 except that 10 percent by mass of pure water serving as an additive to improve the charge-discharge characteristics was added relative to the mass of the whole mixed molten liquid, and this was taken as Example 3. The theoretical capacity of this mixed molten liquid including MeO-TEMPO in Example 3 was 3.56 mAh on a 100 μL of mixed molten liquid basis. In this regard, MeO-TEMPO was contained at a concentration of 4.0 M in the mixed molten liquid in Example 3. Also, the viscosity of this mixed molten liquid was 183 mPa·s.

Charge-Discharge Cycle Test of Examples 1 to 3

The electrochemical cell produced in Example 1 was connected to a charge-discharge apparatus, charge to 4.2 V was performed at 25° C. and a constant current of 0.05 mA and, thereafter, discharge to 2.0 V was performed at a constant current of 0.05 mA. Meanwhile, the electrochemical cells produced in Examples 2 and 3 were connected to the charge-discharge apparatus, charge to 4.2 V was performed at 25° C. and a constant current of 0.127 mA and, thereafter, discharge to 2.0 V was performed at a constant current of 0.127 mA.

Results and Consideration of Examples 1 to 3

Figure 3:
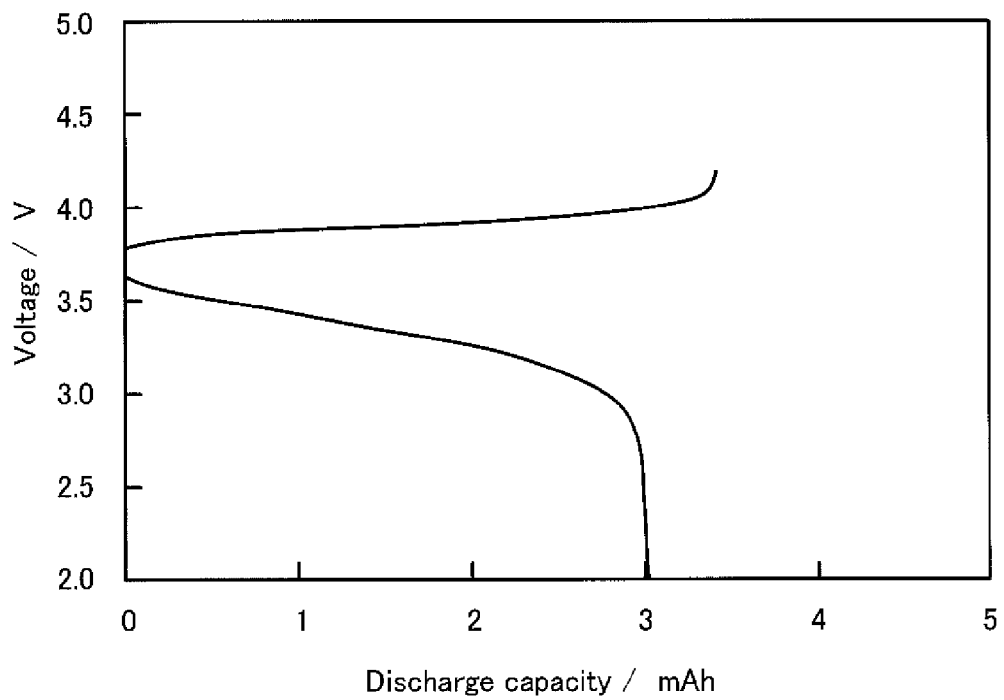
FIG. 3 shows a charge-discharge curve of an electrochemical cell in Example 1.
Figure 4:
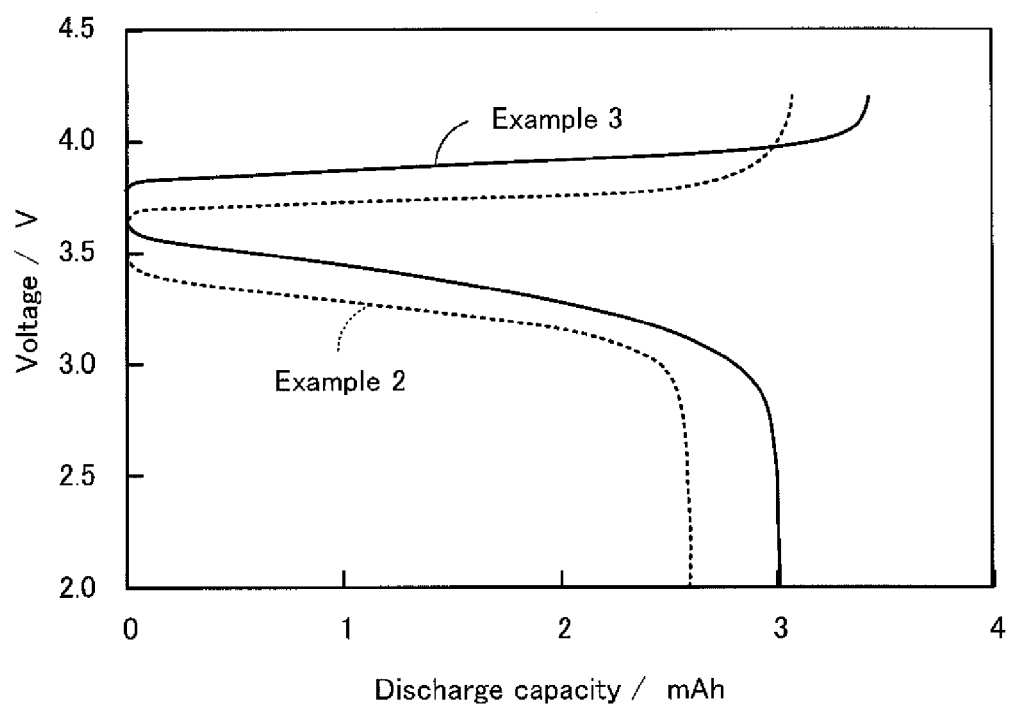
FIG. 4 shows charge-discharge curves of electrochemical cells in Examples 2 and 3.

FIG. 3 shows a charge-discharge curve of the electrochemical cell in Example 1. Also, FIG. 4 shows charge-discharge curves of the electrochemical cells in Examples 2 and 3. As shown in FIG. 3, in Example 1, 3.41 mAh was able to be charged at 3.9 V, and 3.00 mAh of discharge capacity was shown at 3.4 V. Consequently, it was found that charge and discharge was able to be performed by using the mixed molten liquid which was composed of a positive electrode active material and a supporting electrolyte and which did not contain a solvent. Meanwhile, as shown in FIG. 4, in Example 2, 3.06 mAh was able to be charged at 3.7 V, and 2.58 mAh of discharge capacity was shown at 3.4 V. In Example 3, 3.41 mAh was able to be charged at 3.8 V, and 3.00 mAh of discharge capacity was shown at 3.5 V. As described above, it was found that, as for the mixed molten liquid according to the present invention, the battery had both performances of convenience because of the liquid active material and high energy capacity in combination. The reason TEMPO and LiTFSI become liquid by only mixing was not certain in detail, but the reason was estimated that some type of supercooling phenomenon occurred, where crystallization did not occur even at a temperature lower than the melting point because of structure characteristics and the like of these two compounds. Furthermore, it was made clear that addition of water to the mixed molten liquid further increased the discharge capacity and it was found that water was able to be utilized as an additive to improve the charge-discharge characteristics. It was estimated that this related to a shift of the oxidation-reduction potential to the nobler side due to the water. It was considered that the water did not function as a solvent because this water was added after TEMPO and LiTFSI were mixed and dissolved.

In this regard, in the above-described examples, TEMPO and LiTESI were mixed at 3:1, although even when mixing was performed at 1:1 or mixing was performed at 2:1, mixed molten liquids were produced in the same manner. Meanwhile, when the mixed molten liquid in Example 2 was brought to −10° C., the liquid had fluidity. Therefore, it was predicted that the mixed molten liquid would able to be charged and discharged under subfreezing conditions. In addition, 1 percent by mass or 5 percent by mass of water was added to the mixed molten liquid of MeO-TEMPO, and examination was performed. As with Example 3, it was found that the charge-discharge characteristics were further improved. Moreover, examinations were performed on other than Li salts, and it was ascertained that Mg-TFSI became a mixed molten liquid without a solvent by being mixed with a TEMPO compound.

By the way, in Examples 1 to 3 described above, the radical compound and the metal salt were mixed at 3:1 (molar ratio B/A=1/3). However, when the radical compound and the metal salt were mixed at 2:1 (molar ratio B/A=1/2), the viscosity became higher than the viscosity of this, and when the radical compound and the metal salt were mixed at 1:1 (molar ratio B/A=1/1), the viscosity became further higher than the viscosity of this. In this regard, it was ascertained that, as the viscosity increased, the resulting capacity tended to become lower than the theoretical capacity. Consequently, it was found that, from the viewpoint of decrease in the viscosity of the mixed molten liquid and obtainment of the capacity close to the theoretical capacity, preferably, mixing was performed in such a way that the amount of radical compound became more than the amount of metal salt rather than the same amounts of radical compound and metal salt were mixed. On the other hand, it is considered that, theoretically, among the radical compound and the metal salt, a portion which satisfies the radical compound to the metal salt is 1:1 is involved in charge and discharge. Therefore, in a mixture in which the radical compound and the metal salt are mixed at 2:1, one-half of the radical compound may not be involved in charge and discharge, and in a mixture in which the radical compound and the metal salt are mixed at 3:1, two-thirds of the radical compound may not be involved in charge and discharge. Then, in Examples 4 to 11, studies were performed on obtainment of a capacity close to the theoretical capacity by decreasing the viscosity of the mixed molten liquid while the utilization factor of the radical compound was increased. Specifically, the viscosity was decreased by adding an additive to a liquid produced by mixing the radical compound and the metal salt at 1:1.

Example 4

A liquid mixture was obtained by mixing MeO-TEMPO and LiTFSI at a molar ratio of 1:1 (molar ratio B/A=1/1). Each of MeO-TEMPO and LiTFSI was contained in this mixture at a concentration of 3.3 M. Water was added to this mixture in such a way that the volume of this water was tailored to 23% of the whole. The resulting liquid is referred to as a mixed molten liquid. The active material concentration (concentration of each of MeO-TEMPO and LiTFSI) of the mixed molten liquid of MeO-TEMPO in Example 4 was 2.4 M, and the viscosity was measured to be 72 mPa·s. This mixed molten liquid was added by 50 μL to a positive electrode side of a two-chamber type electrochemical cell partitioned by a Li conductive ceramic (produced by OHARA INC.), and carbon paper serving as a collector was immersed. On the negative electrode side, 200 μl of mixed solvent of ethylene carbonate (EC)/diethyl carbonate (DEC) (volume ratio of 3:7), in which 1 M of LiTFSI was dissolved, was added, and metal Li serving as an electrode was immersed. The theoretical capacity of the mixed molten liquid in Example 4 was 3.2 mAh on a 50 μL of mixed molten liquid basis.

Examples 5 to 9

A battery was produced in the same configuration as Example 4 except that the amount of addition of water in Example 4 was changed from 23% to 11%, and this was taken as Example 5. Also, a battery was produced in the same configuration as Example 4 except that the amount of addition of water in Example 4 was changed from 23% to 18%, and this was taken as Example 6. Also, a battery was produced in the same configuration as Example 4 except that the amount of addition of water in Example 4 was changed from 23% to 37%, and this was taken as Example 7. Also, a battery was produced in the same configuration as Example 4 except that the amount of addition of water in Example 4 was changed from 23% to 54%, and this was taken as Example 8. Also, a battery was produced in the same configuration as Example 4 except that the amount of addition of water in Example 4 was changed from 23% to 7%, and this was taken as Example 9.

Example 10

A battery was produced in the same configuration as Example 4 except that the addition of water in Example 4 was changed to addition of acetonitrile, and this was taken as Example 10.

Examples 11 and 12

A battery was produced in the same configuration as Example 4 except that the amount of addition of water in Example 4 was changed from 23% to 5%, and this was taken as Example 11. Also, a battery was produced in the same configuration as Example 4 except that the amount of addition of water in Example 4 was changed from 23% to 80%, and this was taken as Example 12.

Charge-Discharge Cycle Test of Examples 4 to 12

The electrochemical cells produced in Examples 4 to 12 were connected to a charge-discharge apparatus, charge to 4.2 V was performed at 25° C. and a constant current of 0.127 mA and, thereafter, discharge to 3.0 V was performed at a constant current of 0.127 mA.

Results and Consideration of Examples 4 to 12

Figure 5:
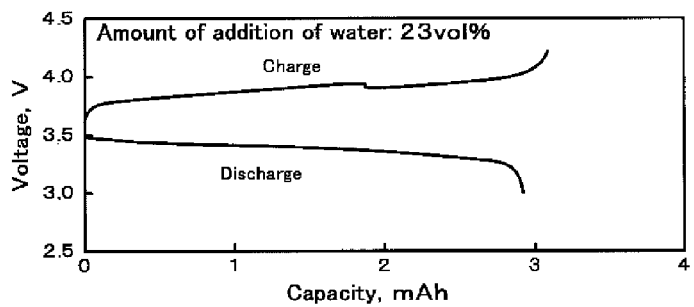
FIG. 5 shows a charge-discharge curve of an electrochemical cell in Example 4.
Figure 6:
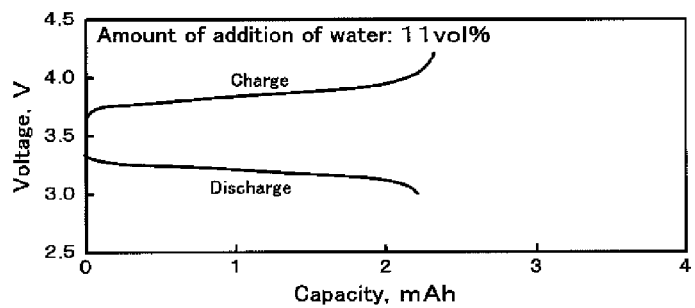
FIG. 6 shows a charge-discharge curve of an electrochemical cell in Example 5.
Figure 7:
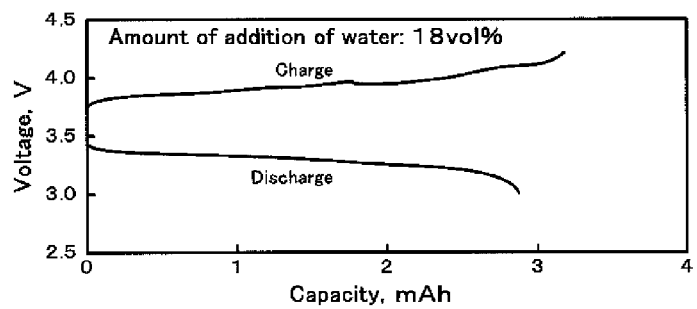
FIG. 7 shows a charge-discharge curve of an electrochemical cell in Example 6.
Figure 8:
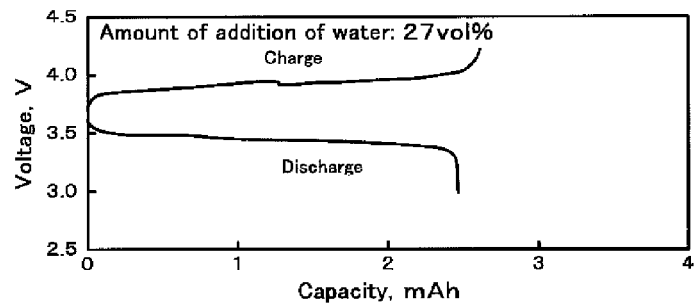
FIG. 8 shows a charge-discharge curve of an electrochemical cell in Example 7.
Figure 9:
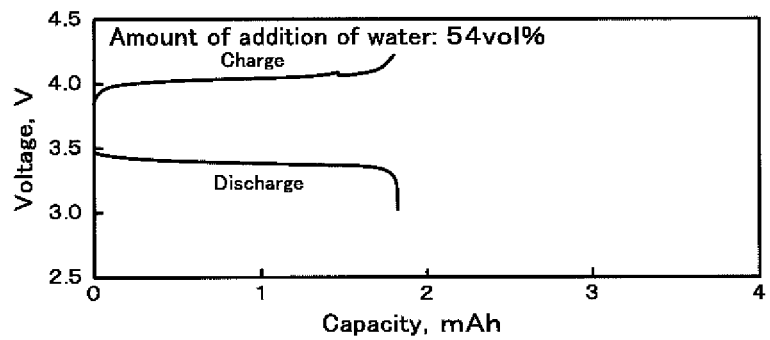
FIG. 9 shows a charge-discharge curve of an electrochemical cell in Example 8.
Figure 10:
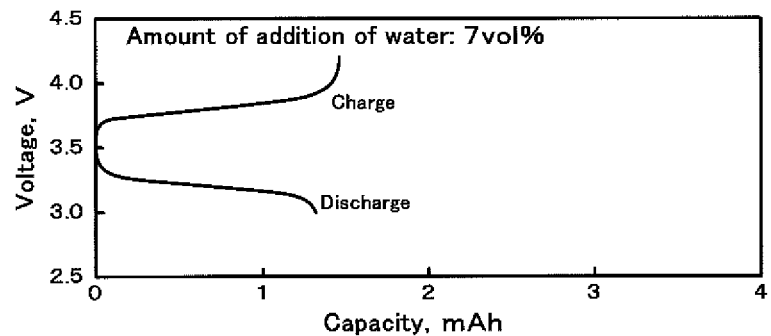
FIG. 10 shows a charge-discharge curve of an electrochemical cell in Example 9.
Figure 11:
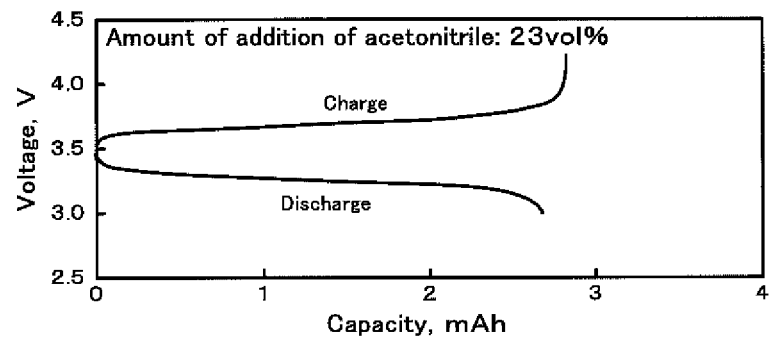
FIG. 11 shows a charge-discharge curve of an electrochemical cell in Example 10.
Figure 12:
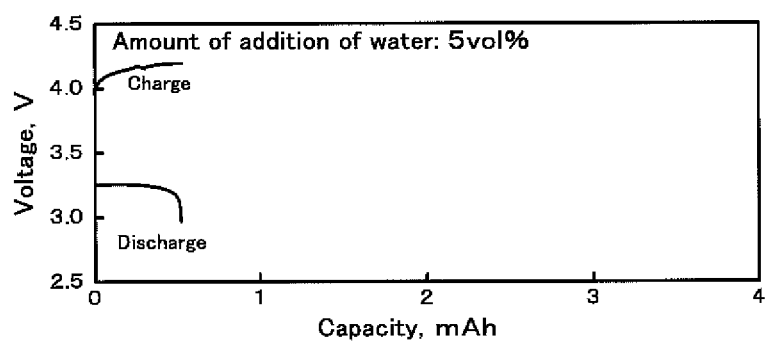
FIG. 12 shows a charge-discharge curve of an electrochemical cell in Example 11.
Figure 13:
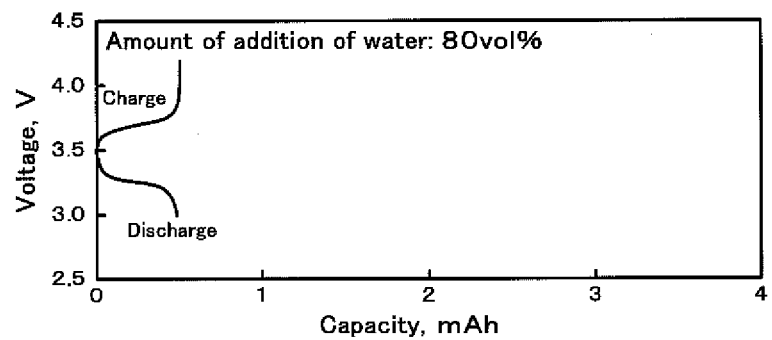
FIG. 13 shows a charge-discharge curve of an electrochemical cell in Example 12.

FIGS. 5 to 13 show charge-discharge curves of the electrochemical cells in Example 4 to 12. As shown in FIGS. 5 to 13, it was found that all of those in Examples 4 to 12 were able to be charged and discharged. Among them, as shown in FIG. 5, in Example 4, 2.9 mAh of discharge capacity was obtained at a discharge potential of about 3.4 V. Consequently, it was found that this battery was a battery having both performances of convenience because of the liquid active material and a high amount of energy in combination. Also, as shown in FIGS. 6 to 10, in Examples 5 to 9, the mixed molten liquid having the same capacity (50 μL) as that in Example 4 was used, and in every case, a high amount of discharge of 1.5 mAh or more was able to be obtained. Consequently, it was found that this battery was a battery having both performances of convenience because of the liquid active material and a high amount of energy in combination. Meanwhile, as shown in FIG. 11, in Example 10, acetonitrile was used instead of water, and 2.7 mAh of discharge capacity was obtained at a discharge potential of about 3.4 V. Consequently, it was found that this battery was a battery having both performances of convenience because of the liquid active material and a high amount of energy in combination even when an organic solvent, e.g., acetonitrile, was used instead of water. Here, in order to study on the type of an additive, Example 4 and Example 10 were compared, where the conditions other than the type of the additive were the same. As a result, the discharge capacity in Example 4, in which the additive was water, was higher than that in Example 10, in which the additive was acetonitrile, and the discharge voltage was also higher. Consequently, it was found that water was more preferable as the additive. Meanwhile, as shown in FIGS. 12 and 13, the discharge capacities in Examples 11 and 12 were about 0.5 mAh and were lower than those in Examples 4 to 10, although these batteries were batteries having both performances of convenience because of the liquid active material and a high amount of energy in combination. It was estimated that, in Example 11, the capacity was lower than those in Examples 4 to 10 because the amount of addition of water was small, the viscosity was high and, thereby, the ionic conductivity became poor. Also, it was estimated that, in Example 12, the viscosity was low, but the theoretical capacity was low (0.5 mAh) because of a low active material concentration and, as a result, the capacity was lower than those in Examples 4 to 10. In this regard, in Examples 4 to 12, the ratio of the radical compound to the metal salt in the mixed molten liquid was 1:1, and 50 µl, of mixed molten liquid was used. Consequently, simple comparison with Examples 1 to 3, in which the ratio of the radical compound to the metal salt in the mixed molten liquid was 3:1, and 100 µL of mixed molten liquid was used, is not appropriate.

Figure 15:
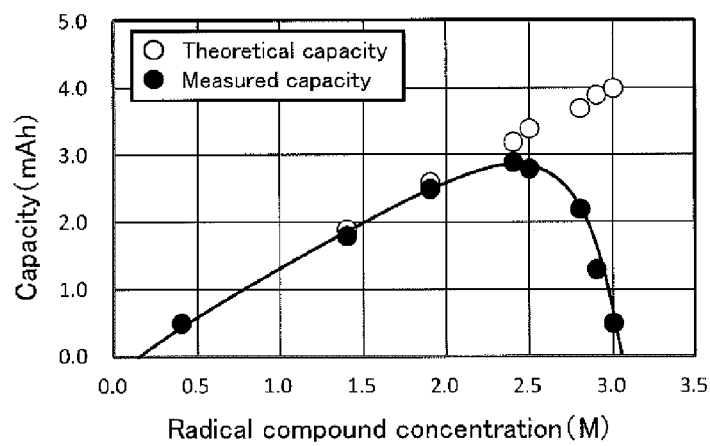
FIG. 15 is a graph showing the relationship between the radical compound concentration and the discharge capacity of a mixed molten liquid.
Figure 16:
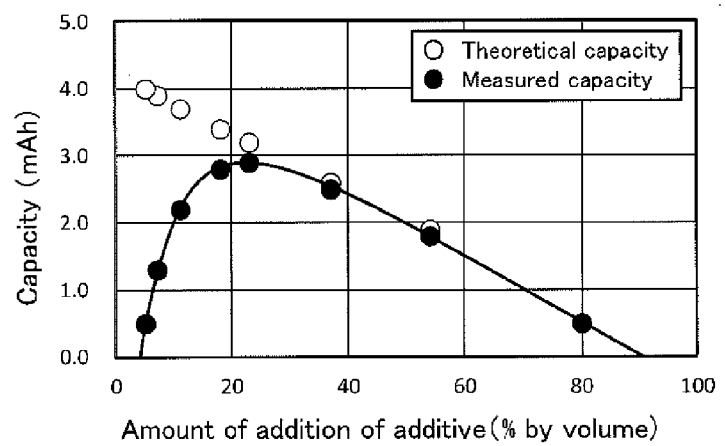
FIG. 16 is a graph showing the relationship between the amount of addition of an additive and the discharge capacity of a mixed molten liquid.

Table 1 collectively shows the radical compound concentrations, the viscosities, and the discharge capacities of the mixed molten liquid in Examples 4 to 12. In addition, the relationship between the viscosity and the discharge capacity of the mixed molten liquid is summarized in FIG. 14. The relationship between the radical compound concentration and the discharge capacity of the mixed molten liquid is summarized in FIG. 15. The relationship between the amount of addition of the additive and the discharge capacity of the mixed molten liquid is summarized in FIG. 16. In this regard, the cases where water was used as the additive (Examples 4 to 9, 11, and 12) were summarized in FIGS. 14 to 16.

and 1,000 mPa·s or less, and more preferably 2.5 mAh or more at 16 mPa·s or more and 700 mPa·s or less. Also, as is clear from FIG. 15, the capacity was 0.5 mAh or more at a radical compound concentration of the mixed molten liquid of 0.5 M or more and 3.0 M or less, 1.0 mAh or more at 0.8 M or more and 2.9 M or less, 2.0 mAh or more at 1.5 M or more and 2.8 M or less, and more preferably 2.5 mAh or more at 1.8 M or more and 2.7 M or less. Also, as is clear from FIG. 16, the capacity was 0.5 mAh or more when the additive was 5 percent by volume or more and 80 percent by volume or less relative to the whole mixed molten liquid, 1.0 mAh or more when the additive was 7 percent by volume or more and 70 percent by volume or less, 2.0 mAh or more when the additive was 10 percent by volume or more and 50 percent by volume or less, and more preferably 2.5 mAh or more when the additive was 13 percent by volume or more and 37 percent by volume or less.

In this regard, it is considered that, in Examples 1 to 12 described above, the radical compound, which was solid at ambient temperature, and the metal salt, which was solid at ambient temperature, were mixed to be liquefied, the additive to decrease the viscosity was added, as necessary, and therefore, the liquid active material having a high active material concentration was able to be obtained relatively easily. This is because it was very difficult to allow the battery active material, such as a TEMPO compound, and the supporting electrolyte equimolar to this to have high concentrations, e.g., 1.5 M or more, at the same time from the viewpoint of the solubility, and it was very difficult to use water or the like as a solvent from the viewpoint of the reactivity with $LiPF_6$ and the like which were common supporting electrolytes for lithium battery. For example, it is not possible to produce a solution of 1.5 M TEMPO 1.5 M $LiPF_6$ in acetonitrile because of the solubility thereof, and when production of an aqueous solution of TEMPO+$LiPF_6$ was attempted, production was not possible because of an occurrence of decomposition of $LiPF_6$ due to water. Meanwhile, a radical compound, e.g., TEMPO, and $LiPF_6$ which was a common supporting electrolyte for a lithium battery were not liquefied by mixing. Therefore, it was considered that, with respect to the battery according to the present invention, a liquid active material having a high active material concentration was able to be

TABLE 1

| | Mixed molten liquid | | | Battery capacity[1] | | Voltage when discharge capacity is 0.5 mAh V |
|---|---|---|---|---|---|---|
| | Additive | | Radical | | Actual | |
| | Type | Amount of addition vol % | compound concentration M | Viscosity mPa · s | Theoretical value mAh | measured value mAh | |
| Example 4 | Water | 23 | 2.4 | 72 | 3.2 | 2.9 | 3.48 |
| Example 5 | Water | 11 | 2.8 | 1261 | 3.7 | 2.2 | 3.24 |
| Example 6 | Water | 18 | 2.5 | 129 | 3.4 | 2.8 | 3.36 |
| Example 7 | Water | 37 | 1.9 | 16 | 2.6 | 2.5 | 3.44 |
| Example 8 | Water | 54 | 1.4 | 7 | 1.9 | 1.8 | 3.41 |
| Example 9 | Water | 7 | 2.9 | 5821 | 3.9 | 1.3 | 3.21 |
| Example 10 | Acetonitrile | 23 | 2.4 | 95 | 3.2 | 2.7 | 3.30 |
| Example 11 | Water | 5 | 3.0 | 12353 | 4.0 | 0.5 | — |
| Example 12 | Water | 80 | 0.4 | 4 | 0.5 | 0.5 | — |

[1]Capacity on 50 µL of mixed molten liquid basis

Figure 14:
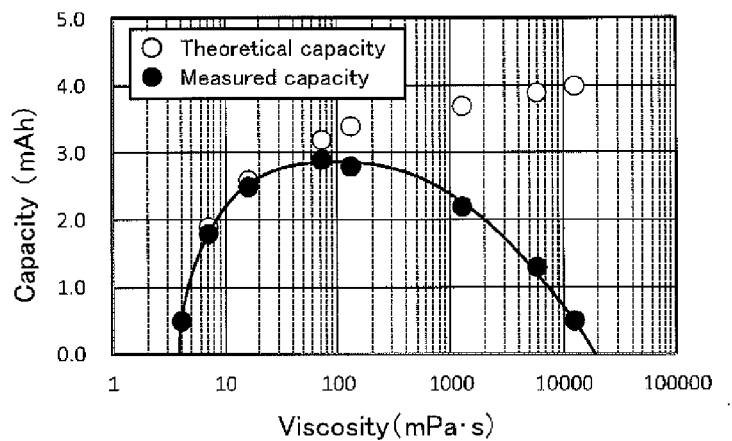
FIG. 14 is a graph showing the relationship between the viscosity and the discharge capacity of a mixed molten liquid.

As is clear from FIG. 14, the capacity was 0.5 mAh or more at a viscosity of the mixed molten liquid of 4 mPa·s or more and 10,000 mPa·s or less, 1.0 mAh or more at 5 mPa·s or more and 7,000 mPa·s or less, 2.0 mAh or more at 10 mPa·s or more obtained relatively easily because the metal salt having a fluoroalkylsulfonyl site was used as the metal salt and the mixed molten liquid obtained by mixing the radical compound and the metal salt was included.

The present application claims priority on the basis of the Japanese Patent Application No. 2012-257466 filed on Nov. 26, 2012, and the Japanese Patent Application No. 2013-182173 filed on Sep. 3, 2013, the entire contents of which are incorporated herein by reference.

What is claimed is:

1. A battery comprising a mixed molten liquid obtained by mixing a radical compound having a nitroxyl radical site and a metal salt having a fluoroalkylsulfonyl site, wherein the mixed molten liquid does not contain a solvent.

2. The battery according to claim 1, wherein the radical compound is an active material and the metal salt is a supporting electrolyte.

3. The battery according to claim 1, wherein the radical compound has a structure represented by the following formula:

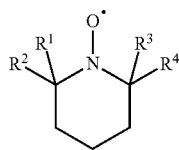

where $R^1$ to $R^4$ represent alkyl groups which may be the same or different.

4. The battery according to claim 1, wherein the metal salt contains at least one of bis(trifluoromethanesulfonyl)imide and bis(pentafluoroethanesulfonyl)imide.

5. The battery according to claim 1, wherein the metal salt is a lithium salt.

6. The battery according to claim 1, further comprising:
a case;
a separator separating an inside of the case into a positive electrode chamber and a negative electrode chamber;
the mixed molten liquid stored in the positive electrode chamber while being in contact with a collector; and
a negative electrode active material stored in the negative electrode chamber.

7. A battery comprising a mixed molten liquid obtained by mixing a radical compound having a nitroxyl radical site and a metal salt having a fluoroalkylsulfonyl site, wherein the mixed molten liquid has:
a concentration of the radical compound of 0.5 mol/L or more;
a concentration of the metal salt of 0.5 mol/L or more; and
a viscosity of 10,000 mPa·s or less.

8. The battery according to claim 7, wherein the mixed molten liquid contains 10 percent by mass or less of water as an additive to improve the charge-discharge characteristics.

9. The battery according to claim 7, wherein the mixed molten liquid is produced by adding an additive, which decreases the viscosity, to a liquid resulting from mixing of the radical compound and the metal salt.

10. The battery according to claim 9, wherein the additive is water or acetonitrile.

11. A battery comprising a mixed molten liquid obtained by mixing a radical compound having a nitroxyl radical site and a metal salt having a fluoroalkylsulfonyl site, wherein in the mixed molten liquid, a molar ratio B/A of a number of moles B of the metal salt to a number of moles A of the radical compound is within a range of 1/50 or more and 2/1 or less.

12. A mixed molten liquid in which a radical compound having a nitroxyl radical site and a metal salt having a fluoroalkylsulfonyl site are mixed, wherein the mixed molten liquid does not contain a solvent.

13. A mixed molten liquid in which a radical compound having a nitroxyl radical site and a metal salt having a fluoroalkylsulfonyl site are mixed, wherein the mixed molten liquid has:
a concentration of the radical compound of 0.5 mol/L or more;
a concentration of the metal salt of 0.5 mol/L or more; and
a viscosity of 10,000 mPa·s or less.

14. A mixed molten liquid in which a radical compound having a nitroxyl radical site and a metal salt having a fluoroalkylsulfonyl site are mixed, wherein in the mixed molten liquid, a molar ratio B/A of a number of moles B of the metal salt to a number of moles A of the radical compound is within a range of 1/50 or more and 2/1 or less.

* * * * *